United States Patent
Lim et al.

(10) Patent No.: US 10,356,113 B2
(45) Date of Patent: Jul. 16, 2019

(54) APPARATUS AND METHOD FOR DETECTING ABNORMAL BEHAVIOR

(71) Applicant: Korea Electric Power Corporation, Seoul (KR)

(72) Inventors: Yong-Hun Lim, Daejeon (KR); Seong-Ho Ju, Daejeon (KR); Chung-Hyo Kim, Daejeon (KR); Yoo-Jin Kwon, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 338 days.

(21) Appl. No.: 15/207,386

(22) Filed: Jul. 11, 2016

(65) Prior Publication Data
US 2018/0013778 A1  Jan. 11, 2018

(51) Int. Cl.
H04L 29/06   (2006.01)

(52) U.S. Cl.
CPC ........ *H04L 63/1425* (2013.01); *H04L 63/101* (2013.01); *H04L 63/1416* (2013.01)

(58) Field of Classification Search
CPC ... H04L 63/101; H04L 63/20; H04L 63/1416; H04L 63/0263; H04L 63/1408; H04L 63/0227; H04L 63/10; H04L 63/02; H04L 63/0245; H04L 63/0236; H04L 67/22; H04L 67/42
See application file for complete search history.

(56) References Cited

U.S. PATENT DOCUMENTS

| | | | |
|---|---|---|---|
| 8,782,792 B1 * | 7/2014 | Bodke | G06F 21/53 713/187 |
| 8,950,007 B1 * | 2/2015 | Teal | G06F 21/554 726/30 |
| 9,736,182 B1 * | 8/2017 | Madhukar | H04L 63/20 |
| 2008/0109876 A1 * | 5/2008 | Hitomi | G06F 9/468 726/2 |
| 2009/0158430 A1 * | 6/2009 | Borders | G06F 21/552 726/23 |
| 2010/0122313 A1 * | 5/2010 | Ivgi | G06F 21/6218 726/1 |
| 2012/0030750 A1 * | 2/2012 | Bhargava | H04L 63/02 726/13 |

(Continued)

FOREIGN PATENT DOCUMENTS

| | | |
|---|---|---|
| JP | 2008-060766 A | 3/2008 |
| KR | 10-2011-0119929 A | 11/2011 |

(Continued)

*Primary Examiner* — Tae K Kim
(74) *Attorney, Agent, or Firm* — Morgan, Lewis & Bockius LLP (57) ABSTRACT

Disclosed herein are an apparatus and method for detecting abnormal behavior in a main device and a terminal device, included in a control network, using a whitelist. The apparatus for detecting abnormal behavior includes an information collection unit for collecting system information about the main device and system information about the terminal device and a detection unit for detecting abnormal behavior in the main device and the terminal device by comparing a whitelist with system information that includes the system information about the main device and the system information about the terminal device, wherein the whitelist includes a process whitelist, a file whitelist, and a network whitelist.

16 Claims, 7 Drawing Sheets

(56) References Cited

U.S. PATENT DOCUMENTS

| | | | |
|---|---|---|---|
| 2013/0097659 A1* | 4/2013 | Das | G06F 21/629 |
| | | | 726/1 |
| 2013/0097660 A1* | 4/2013 | Das | H04L 63/10 |
| | | | 726/1 |
| 2013/0097708 A1* | 4/2013 | Jayanthi | G06F 21/554 |
| | | | 726/25 |
| 2013/0111591 A1* | 5/2013 | Topan | G06F 21/563 |
| | | | 726/24 |
| 2013/0276120 A1* | 10/2013 | Dalcher | G06F 21/554 |
| | | | 726/24 |
| 2015/0074828 A1* | 3/2015 | Beauregard | G06F 9/468 |
| | | | 726/28 |
| 2015/0121449 A1* | 4/2015 | Cp | H04L 63/145 |
| | | | 726/1 |
| 2015/0150124 A1* | 5/2015 | Zhang | H04L 63/1408 |
| | | | 726/22 |
| 2016/0099963 A1* | 4/2016 | Mahaffey | H04L 63/0227 |
| | | | 726/25 |
| 2016/0371472 A1* | 12/2016 | Walsh | H04L 63/102 |
| 2017/0093918 A1* | 3/2017 | Banerjee | H04L 63/101 |
| 2017/0295188 A1* | 10/2017 | David | H04L 63/0428 |
| 2017/0310686 A1* | 10/2017 | Ray | H04L 63/08 |
| 2017/0351854 A1* | 12/2017 | Knapp | G06F 21/445 |

FOREIGN PATENT DOCUMENTS

| | | |
|---|---|---|
| KR | 10-2013-0034773 A | 4/2013 |
| KR | 10-2013-0096039 A | 8/2013 |

* cited by examiner

| INFORMATION ABOUT EXECUTED PROCESS | INFORMATION ABOUT FILE ACCESS | INFORMATION ABOUT NETWORK USAGE |

FIG. 4

(a) PROCESS WHITELIST

| CHILD PROCESS | HASH VALUE (VALUE FOR CHECKING INTEGRITY) | PARENT (EXECUTED) PROCESS |
|---|---|---|
| | | |

(b) FILE WHITELIST

| FILE NAME | HASH VALUE (VALUE FOR CHECKING INTEGRITY) | FILE ACCESS PROCESS |
|---|---|---|
| | | |

(c) NETWORK WHITELIST

| IP ADDRESS/PORT NUMBER OF NETWORK CONNECTION | NETWORK PROCESS | HASH VALUE (VALUE FOR CHECKING INTEGRITY) |
|---|---|---|
| | | |

FIG. 5

(a) STATE VALUE FOR EACH PROCESS

| PROCESS | AMOUNT OF RESOURCES FOR PROCESS |
|---|---|

(b) STATE VALUE FOR EACH FILE

| FILE | FILE ACCESS PATTERN AND NUMBER OF ACCESSES TO FILE |
|---|---|

(c) STATE VALUE FOR EACH NETWORK

| IP ADDRESS/PORT NUMBER OF NETWORK CONNECTION | NETWORK ACCESS PATTERN AND NUMBER OF SESSIONS |
|---|---|

FIG. 6

| MAIN DEVICE PROCESS USER | MAIN DEVICE NETWORK PROCESS | IP ADDRESS/PORT NUMBER OF MAIN DEVICE | IP ADDRESS/PORT NUMBER OF TERMINAL DEVICE | TERMINAL DEVICE NETWORK PROCESS | TERMINAL DEVICE PROCESS USER |
|---|---|---|---|---|---|

APPARATUS AND METHOD FOR DETECTING ABNORMAL BEHAVIOR

BACKGROUND OF THE INVENTION

1. Technical Field

The present invention relates generally to an apparatus and method for detecting abnormal behavior and, more particularly, to an apparatus and method that are capable of detecting abnormal behavior in a main device and terminal device, included in a control network, using a whitelist.

2. Description of the Related Art

In order to detect abnormal behavior in a terminal device or a main device, a method using a blacklist is mainly used. However, when malicious code detection or the like is performed by a method using a blacklist in a control system in which only a program specialized for a specific purpose is used, there is a disadvantage that a large load is imposed on an embedded system, which operates using limited resources. Also, because a control system is operated as a closed network, it is difficult to update blacklisted patterns. Accordingly, a method using a whitelist based on reliability has constantly been required.

As a result, various techniques for checking files for detecting malicious code based on a whitelist are being researched. In this respect, there is Korean Patent No. 1360591 titled "Apparatus and method for monitoring network using whitelist". Korean Patent No. 1360591 discloses a method in which protocols of communication nodes in a network, the characteristics of protocols according to services, the characteristics of a correlation between communication nodes, and security policies of an organization are whitelisted, and abnormal behavior is detected using the whitelist. This method may effectively detect abnormal behavior in a control network by monitoring the network based on a whitelist. However, this method has limitations in finding the cause of a problem and actively taking action against the problem, and does not provide a solution by which the availability of the control system and network is guaranteed.

SUMMARY OF THE INVENTION

An object of the present invention is to provide an apparatus and method for detecting abnormal behavior, which may minimize the load on a main device or terminal device and detect abnormal behavior in the main device and terminal device.

In order to accomplish the above object, an apparatus for detecting abnormal behavior, which collects system information from a main device and a terminal device in a control network and detects abnormal behavior in the main device and the terminal device based on the collected system information, includes an information collection unit for collecting system information about the main device and system information about the terminal device; and a detection unit for detecting abnormal behavior in the main device and the terminal device by comparing a whitelist with system information that includes the system information about the main device and the system information about the terminal device, wherein the whitelist includes a process whitelist, a file whitelist, and a network whitelist.

Also, the detection unit may include a device check module, by which at least one of whether at least one of an unauthorized file and an unauthorized process is executed in the main device or the terminal device and whether an unauthorized network connection is present is checked by extracting information to be checked from the system information and comparing the information to be checked with the whitelist.

Also, the detection unit may further include a state determination module by which information about a state value is extracted from the system information and at least one of whether resources used for at least one of a file and a process, executed in the main device and terminal device, are fewer than predetermined resources and whether a network load is less than a predetermined load threshold value is determined based on the information about the state value.

Also, the information about the state value may include information about a process state value, information about a file state value, and information about a network state value for each of the main device and the terminal device, wherein the information about the process state value may include information about a process executed in each of the main device and the terminal device and information about a threshold amount of resources used for the process, the information about the file state value may include information about a file executed in each of the main device and the terminal device, a pattern of access to the file, and information about a threshold number of accesses to the file, and the information about the network state value may include information about an IP address and port number for a network and information about a network access pattern and a number of sessions.

Also, when the device check module determines that there is no problem in the main device or the terminal device, the state determination module may perform the determination.

Also, the detection unit may further include a network check module for determining whether an unauthorized network process or an unauthorized service connection is present in the main device or the terminal device.

Also, the apparatus may further include a countermeasure unit for generating and transmitting a countermeasure signal when abnormal behavior is detected in at least one of the main device and the terminal device.

Also, the process whitelist may include information about a parent process, information about a child process, and a hash value for each of the main device and the terminal device.

Also, the file whitelist may include information about a file, information about a file access process, and a hash value for each of the main device and the terminal device.

Also, the network whitelist may include an IP address and port number for a network, information about a network process, and a hash value for each of the main device and the terminal device.

In order to accomplish the above object, a method for detecting abnormal behavior, in which system information is collected from a main device and a terminal device in a control network and abnormal behavior in the main device and the terminal device is detected based on the collected system information, comprises collecting, by an information collection unit, system information about the main device and system information about the terminal device; and detecting, by a detection unit, abnormal behavior in the main device and the terminal device by comparing a whitelist with system information that includes the system information about the main device and the system information about the terminal device, wherein the whitelist includes a process whitelist, a file whitelist, and a network whitelist.

Also, detecting the abnormal behavior in the main device and the terminal device may comprise checking, by a device check module, at least one of whether at least one of an unauthorized file and an unauthorized process is executed in the main device or the terminal device and whether an unauthorized network connection is present by extracting information to be checked from the system information and comparing the information to be checked with the whitelist.

Also, detecting the abnormal behavior in the main device and the terminal device may further comprise extracting, by a state determination module, information about a state value from the system information, and determining, by the state determination module, at least one of whether resources used for at least one of a file and a process, executed in the main device and the terminal device, are fewer than predetermined resources and whether a network load is less than a predetermined load threshold value based on the information about the state value.

Also, the information about the state value may include information about a process state value, information about a file state value, and information about a network state value for each of the main device and the terminal device, wherein the information about the process state value may include information about a process executed in each of the main device and the terminal device and information about a threshold amount of resources used for the process, the information about the file state value may include information about a file executed in each of the main device and the terminal device, a pattern of access to the file, and information about a threshold number of accesses to the file, and the information about the network state value may include information about an IP address and port number for a network and information about a network access pattern and a number of sessions.

Also, determining at least one of whether resources used for at least one of a file and a process, executed in the main device and the terminal device, are fewer than the predetermined resources and whether a network load is less than the predetermined load threshold value may be performed when it is determined that there is no problem in the main device or the terminal device as a result of checking at least one of whether at least one of an unauthorized file and an unauthorized process is executed in the main device or the terminal device and whether an unauthorized network connection is present.

Also, detecting the abnormal behavior in the main device and the terminal device may further comprise checking, by a network check module, whether an unauthorized network process and an unauthorized service connection is present in the main device or the terminal device.

Also, the method may further comprise generating and transmitting, by a countermeasure unit, a countermeasure signal when abnormal behavior is detected in at least one of the main device and the terminal device.

Also, the process whitelist may include information about a parent process, information about a child process, and a hash value for each of the main device and the terminal device.

Also, the file whitelist may include information about a file, information about a file access process, and a hash value for each of the main device and the terminal device.

Also, the network whitelist may include an IP address and port number for a network, information about a network process, and a hash value for each of the main device and the terminal device.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, an apparatus and method for detecting abnormal behavior according to an embodiment of the present invention will be described.

Figure 1:
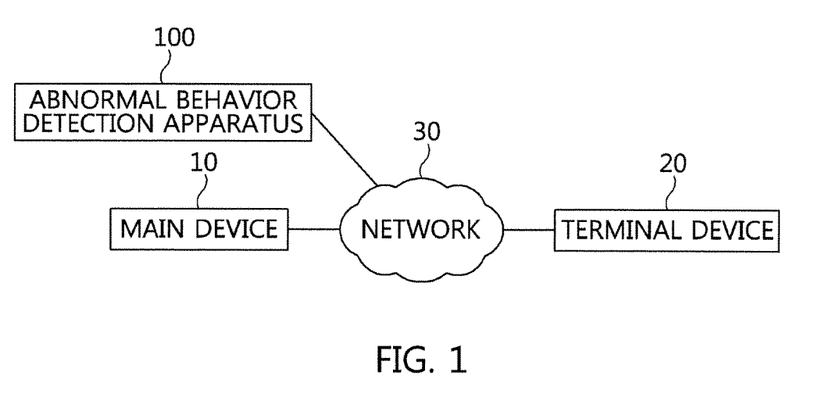
FIG. 1 is a concept diagram for an apparatus for detecting abnormal behavior according to an embodiment of the present invention.
Figure 2:
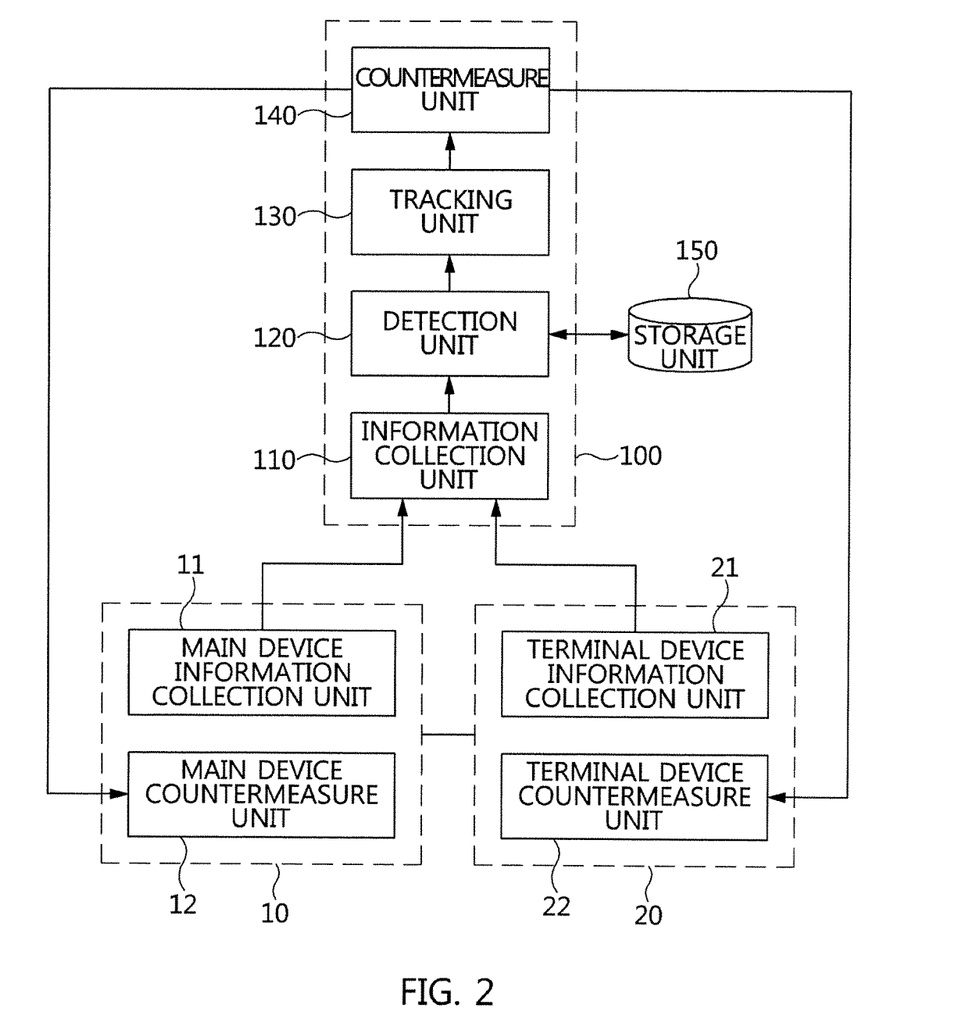
FIG. 2 is a block diagram of an apparatus for detecting abnormal behavior according to an embodiment of the present invention.

FIG. 1 is a concept diagram for an abnormal behavior detection apparatus 100 according to an embodiment of the present invention. FIG. 2 is a block diagram of the abnormal behavior detection apparatus 100 according to an embodiment of the present invention. The abnormal behavior detection apparatus 100 according to an embodiment of the present invention uses a whitelist in order to detect abnormal behavior in a main device 10 and a terminal device 20, which are connected to each other via a network 30. Specifically, the main device 10, the terminal device 20, and the abnormal behavior detection apparatus 100 according to an embodiment of the present invention are connected to each other via a network 30, and the abnormal behavior detection apparatus 100 may monitor the devices based on a whitelist. Also, the abnormal behavior detection apparatus 100 according to an embodiment of the present invention may be specialized for use in a control system environment in which a request is processed using a specific program on a main device 10 and a response thereto is processed using a specific program on a terminal device. Also, the abnormal behavior detection apparatus 100 according to an embodiment of the present invention may detect abnormal behavior in the main device 10 and the terminal device 20 by comparing a previously stored whitelist with system information collected from the main device 10 and the terminal device 20. To this end, the abnormal behavior detection apparatus 100 according to an embodiment of the present invention may include an information collection unit 110, a detection unit 120, a tracking unit 130 and a countermeasure unit 140. Hereinafter, the components of the abnormal behavior detection apparatus 100 according to an embodiment of the present invention will be described with reference to FIG. 1 and FIG. 2.

The information collection unit 110 collects system information about a main device 10 and system information about a terminal device 20. Specifically, as illustrated in FIG. 2, the main device 10 includes a main device information collection unit 11 for collecting system information about the main device 10, the terminal device 20 includes a terminal device information collection unit 21 for collecting system information about the terminal device 20, and the information collection unit 110 of the present invention periodically collects the system information collected by the main device information collection unit 11 and the terminal device information collection unit 21.

Figure 4:
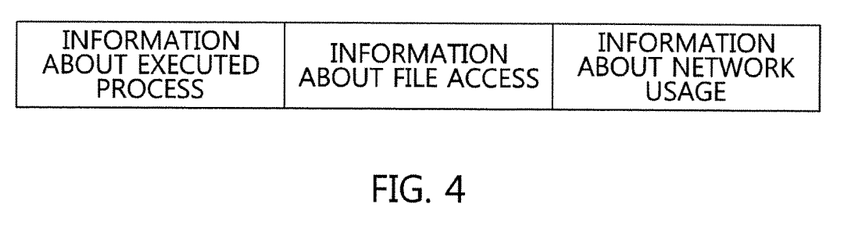
FIG. 4 is a view illustrating the data structure for system information collected from a main device and a terminal device according to an embodiment of the present invention.

As described above, the abnormal behavior detection apparatus 100 according to an embodiment of the present invention detects abnormal behavior in the main device 10 and the terminal device 20 based on a whitelist. In other words, the system information collected by the information collection unit 110 is defined as whitelist-related system information. For example, the system information collected by the information collection unit 110 may include information about processes executed in the main device 10 and the terminal device 20, information about access to files, and information about network usage (Refer to FIG. 4).

Figure 5:
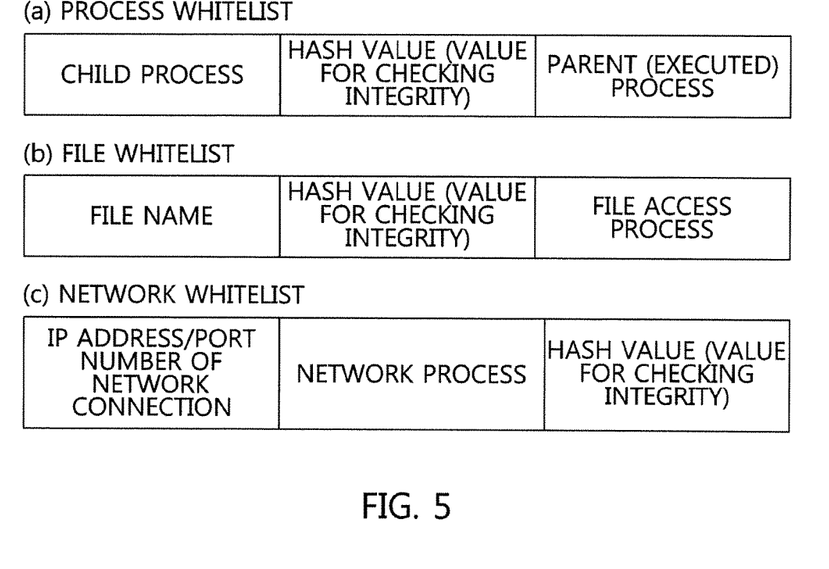
FIG. 5 is a view illustrating the data structure of a whitelist according to an embodiment of the present invention.

The whitelist may be classified into a process whitelist, a file whitelist, and a network whitelist. Here, the process whitelist may include the name of a process executed in the main device 10 and terminal device 20, the hash value of the process, and information about a parent process of the process. Also, the file whitelist may include the name of a file executed on the main device 10 and the terminal device 20, the hash value of the file, and information about the process that accesses the file. Also, the network whitelist may include the IP address and port number of a network connection for the main device 10 and the terminal device 20, the name of a network process, and the hash value of the network process. Here, the hash values included in the respective whitelists are used for integrity checking. The data structures for the whitelists are illustrated in FIG. 5.

The detection unit 120 detects abnormal behavior in the main device 10 and the terminal device 20 by comparing the whitelist with the system information, which includes the main device system information and the terminal device system information. The process of detecting abnormal behavior, performed by the detection unit 120, is described below. First, the detection unit 120 extracts information to be checked from the system information collected by the information collection unit 110. At least one of whether at least one of an unauthorized file and an unauthorized process is executed in the main device 10 or the terminal device 20 and whether an unauthorized network connection is present may be checked by comparing the information to be checked with the whitelist.

Also, even if the result of checking the main device 10 and the terminal device 20 based on the information to be checked falls within a normal range, the detection unit 120 may further check at least one of whether resources used for at least one of a file and a process, executed in the main device 10 and terminal device 20, are fewer than predetermined resources and whether a network load is less than a predetermined load threshold value based on information about the state values of the main device 10 and terminal device 20. Accordingly, the abnormal behavior detection apparatus 100 according to an embodiment of the present invention may more accurately detect whether files and processes are executed in a permissible range and whether network connections in the main device 10 and terminal device 20 are established in a permissible range.

Here, information about the state values may include information about the process state values, information about the file state values, and information about the network state values for each of the main device 10 and the terminal device 20. Specifically, information about the process state values may include information about a process executed in each of the main device 10 and the terminal device 20 and information about the threshold amount of resources used for the process. Also, information about the file state values may include information about a file executed in each of the main device 10 and the terminal device 20 and information about a pattern of access to the file and the threshold number of accesses to the file. Also, information about the network state values may include the IP address and port number of a network connection and information about a network access pattern and the number of sessions.

Also, the detection unit 120 may further check whether an unauthorized network process or an unauthorized service connection is present in the main device 10 or the terminal device 20.

When it is determined by the detection unit 120 that a problem occurs in at least one of the main device 10 and the terminal device 20, the tracking unit 130 tracks the cause of the problem by linking network processes. For example, the cause may be found by tracing the processes by linking a child process to a parent process.

In order to solve the cause of the problem found by the tracking unit 130, the countermeasure unit 140 generates a countermeasure signal and transmits the signal to at least one of the main device 10 and the terminal device 20, in which the problem occurred. As illustrated in FIG. 2, the main device 10 and the terminal device 20 include a main device countermeasure unit 12 and a terminal device countermeasure unit 22, respectively. Accordingly, the main device countermeasure unit 12 and the terminal device countermeasure unit 22 may perform interruption of the execution of a process, changing the permission on a file, blocking a network, or the like based on the received signal.

Figure 3:
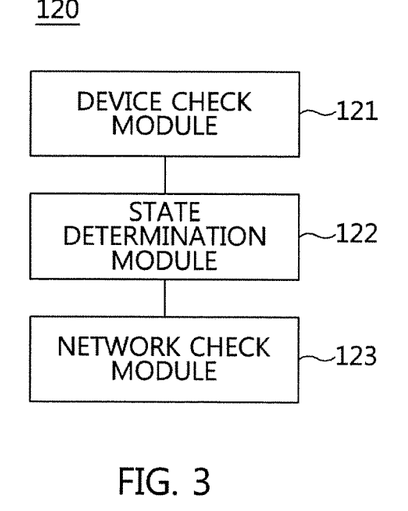
FIG. 3 is a block diagram of a detection unit included in the abnormal behavior detection apparatus of the present invention.

FIG. 3 is a block diagram of the detection unit 120 included in an abnormal behavior detection device of the present invention. As described above, the detection unit 120 according to an embodiment of the present invention serves to detect abnormal behavior in the main device 10 and the terminal device 20 by comparing a whitelist with system information, which includes main device system information and terminal device system information. To this end, the detection unit 120 according to an embodiment of the present invention may include a device check module 121, a state determination module 122, and a network check module 123. Hereinafter, the components of the detection unit 120 according to an embodiment of the present invention will be described.

The device check module 121 checks at least one of whether at least one of an unauthorized file and an unauthorized process is executed in the main device or the terminal device and whether an unauthorized network connection is present. The device check module 121 may perform the checking process by comparing information to be checked with a whitelist. Here, the information to be checked is extracted from the system information collected by the information collection unit 110.

Figure 6:
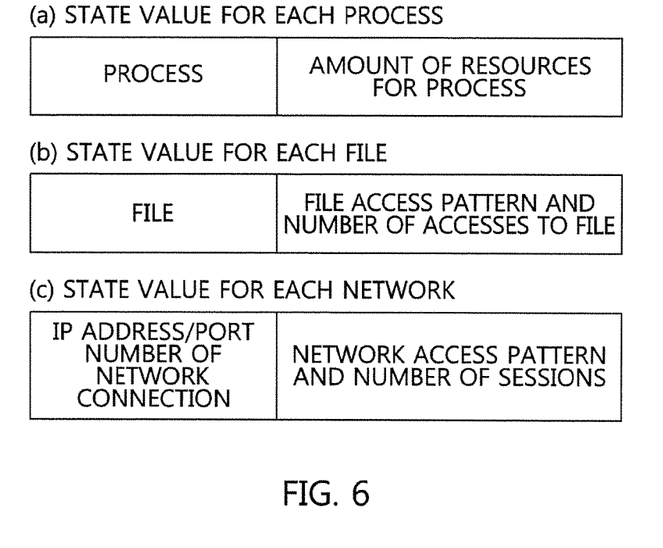
FIG. 6 is a view illustrating the data structure for information about the state values of a main device and a terminal device according to an embodiment of the present invention.

The state determination module 122 determines at least one of whether resources used for at least one of a file and a process, executed in the main device and the terminal device, are fewer than predetermined resources and whether a network load is less than a predetermined load threshold value. Here, the state determination module 122 may perform the determination process after no problem is found as the result of the checking process performed by the device check module 121. Also, the state determination module 122 may perform the determination process based on information about the state values of the main device and the terminal device. Here, the information about the state values is extracted by the information collection unit 110, and may include information about process state values, information about file state values, and information about network state values for each of the main device and the terminal device. Here, the information about the process state values may include information about a process executed in each of the main device and the terminal device and information about the threshold amount of resources used for the process. Also, the information about the file state values may include information about a file executed in each of the main device and the terminal device and information about a pattern of access to the file and the threshold number of accesses to the file. Also, the information about the network state values may include the IP address and port number for a network and information about a network access pattern and the number of sessions (Refer to FIG. 6).

The network check module 123 checks whether an unauthorized network process or an unauthorized service connection is present in the main device or the terminal device. To this end, the network check module 123 may use the network process information (Refer to FIG. 7), generated by the information collection unit 110.

Figure 8:
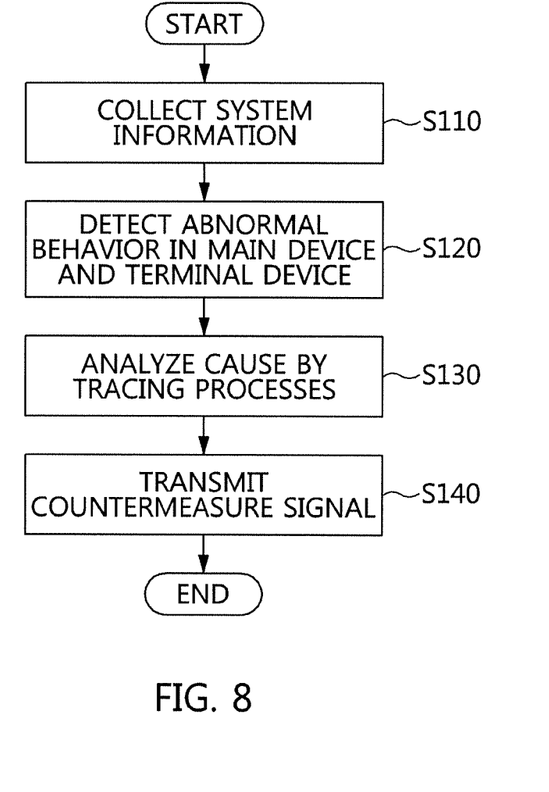
FIG. 8 is a flowchart of a method for detecting abnormal behavior according to an embodiment of the present invention.

FIG. 8 is a flowchart of a method for detecting abnormal behavior according to an embodiment of the present invention. The method for detecting abnormal behavior according to an embodiment of the present invention is configured to detect abnormal behavior in the main device and the terminal device, which are connected via a network, using a whitelist. Specifically, in the method for detecting abnormal behavior according to an embodiment of the present invention, system information is collected from a main device and a terminal device in the control network, and abnormal behavior in the main device and the terminal device is detected by comparing the collected system information with a whitelist. Hereinafter, the method for detecting abnormal behavior according to an embodiment of the present invention will be described with reference to FIG. 8. Here, a repeated description with reference to FIGS. 1 to 3 will be omitted.

First, system information about a main device and system information about a terminal device are collected by an information collection unit at step S110. As described with reference to FIG. 1 and FIG. 2, the main device includes a main device information collection unit for collecting system information about the main device, and the terminal device includes a terminal device information collection unit for collecting system information about the terminal device. In other words, system information collected by each of the devices is collected at step S110. Here, the system information is defined as whitelist-related system information. For example, the system information collected by the information collection unit may include information about processes executed in the main device and the terminal device, information about access to files, and information about network usage. Because the data structure for the system information has been described with reference to FIG. 4, an additional description will be omitted.

Then, abnormal behavior in the main device and terminal device is detected by a detection unit at step S120 by comparing a whitelist with the system information, which includes the main device system information and the terminal device system information. As described above, the whitelist may include a process whitelist, a file whitelist, and a network whitelist. Here, the process whitelist may include information about a parent process and a child process in the main device and terminal device and a hash value of a process. Also, the file whitelist may include the name of a file in the main device and terminal device, information about a process that accesses the file, and the hash value of the file. Also, the network whitelist may include the IP address and port number of a network connection for the main device and terminal device, the name of a network process, and the hash value of the network process (Refer FIG. 5). Here, because the detection process performed at step S120 has been described in detail with reference to FIGS. 2 and 3, an additional description will be omitted.

Then, if it is determined at step S120 that a problem has occurred in at least one of the main device and the terminal device, the cause of the problem is tracked by a tracking unit at step S130 by linking network processes. For example, at step S130, the cause may be found by tracing the processes by linking a child process to a parent process thereof.

Then, in order to solve the cause of the problem, a countermeasure unit generates a countermeasure signal and transmits it to at least one of the main device and the terminal device, in which the problem occurred, at step S140. As described above, the main device and the terminal device include the main device countermeasure unit and the terminal device countermeasure unit, respectively. Accordingly, the main device countermeasure unit and the terminal device countermeasure unit may solve the problem by performing interruption of the execution of a process, changing the permission on a file, blocking a network, or the like based on the received countermeasure signal.

Figure 9:
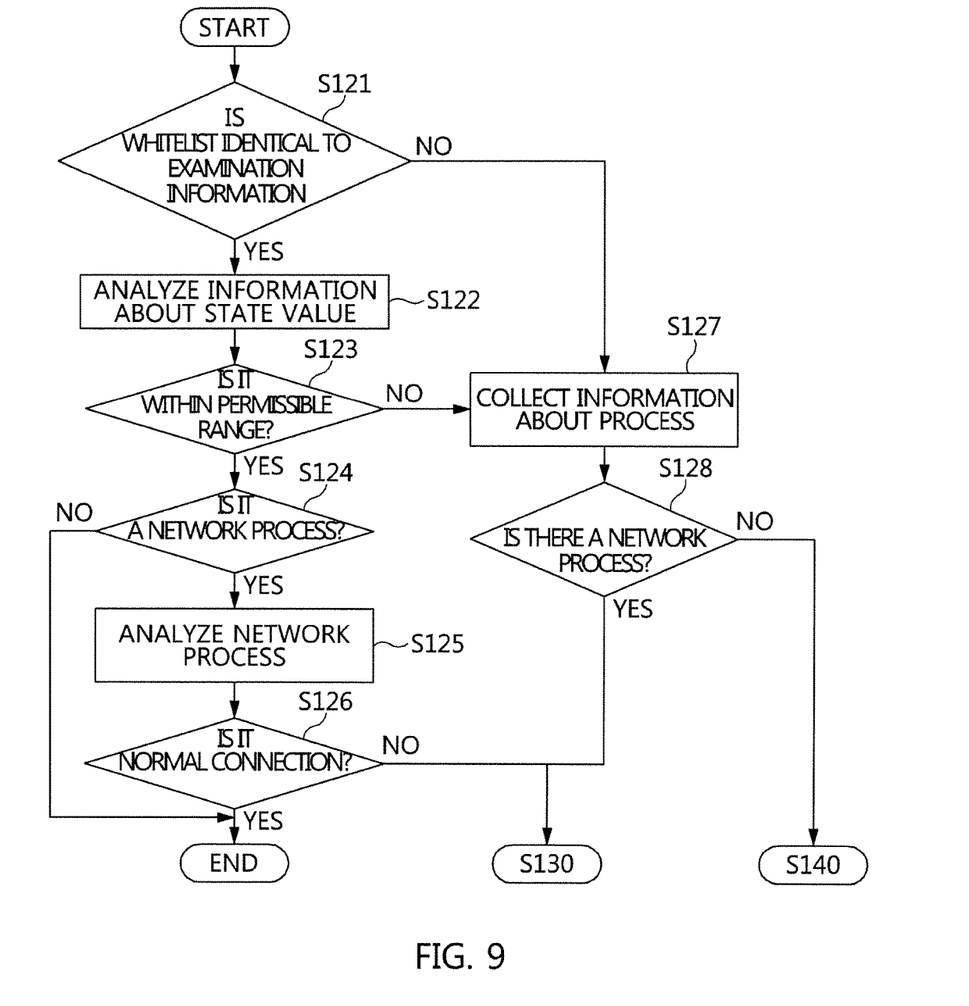
FIG. 9 is a flowchart of a step for detecting abnormal behavior in a main device and a terminal device according to an embodiment of the present invention.

FIG. 9 is a flowchart of a step for detecting abnormal behavior in the main device and the terminal device according to an embodiment of the present invention. Hereinafter, the step for detecting abnormal behavior in the main device and the terminal device according to an embodiment of the present invention will be described with reference to FIG. 9.

First, whether information to be checked is identical to a whitelist is checked at step S121. Specifically, at step S121, a device check module extracts information to be checked from system information and compares the information to be checked with a whitelist (a process whitelist, a file whitelist, and a network whitelist for each of the main device and the terminal device), whereby at least one of whether at least one of an unauthorized file and an unauthorized process is executed in the main device or the terminal device and whether an unauthorized network connection is present is checked. If it is determined at step S121 that the information to be checked is identical to the whitelist, step S122 is performed. Conversely, if not, step S127 is performed.

At step S122, information about state values is analyzed. Here, information about the state values is extracted from the system information by a state determination module. Specifically, the state values related to a process, the state values related to file access, and the state values related to a network connection for each of the devices are analyzed through comparison at step S122.

Here, the information about the state values may include information about the process state values, information about the file state values, and information about the network state values for each of the main device and the terminal device. Specifically, the information about the process state values may include information about a process executed in each of the main device and the terminal device and information about the threshold amount of resources used for the process. Also, the information about the file state values may include a file executed in each of the main device and the terminal device and information about a pattern of access to the file and the threshold number of accesses to the file. Also, the information about the network state values may include information about the IP address and port number for a network and information about a network access pattern and the number of sessions.

Then, using the result of analysis at step S122, whether the system state value of the main device and terminal device falls within a permissible range is determined at step S123. If it is determined at step S123 that the system state value falls within the permissible range, step S124 is performed. If not, step S127 is performed.

At step S124, whether a network process is present is determined. If it is determined that a network process is present, step S125 is performed. If not, the step for detecting abnormal behavior is terminated.

Figure 7:
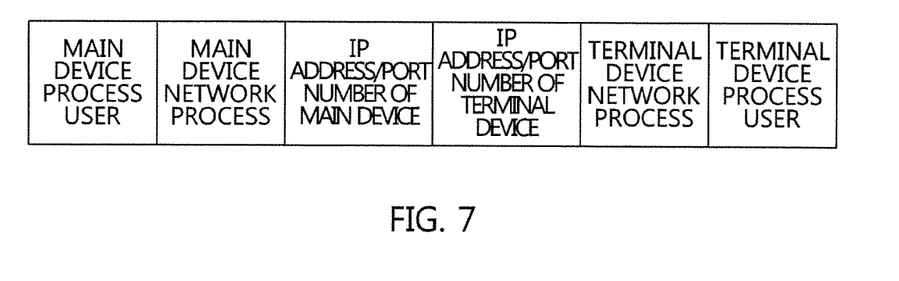
FIG. 7 is a view illustrating the data structure for information about a network process of a main device and a terminal device according to an embodiment of the present invention.

At step S125, a network process is analyzed using a main device-terminal device connection whitelist. The data structure analyzed at step S125 is illustrated in FIG. 7. Specifically, at step S125, the network process, IP address, and port number of the main device and the network process, IP address, and port number of the terminal device are compared with the main device-terminal device connection whitelist.

Then, whether the connection between the network process of the main device and the network process of the terminal device is an authorized network connection is determined at step S126. If it is determined at step S126 that the connection is a normal connection, the step for detecting abnormal behavior is terminated. If not, step S130 is performed in order to check the network connecting the main device and the terminal device and to trace processes.

At step S127, information about processes is collected. Specifically, step S127 is performed when it is determined that execution of malicious code or of an unauthorized application, unauthorized access to a file, an unauthorized network connection, or the like occurs. At step S127, information about parent and child processes is collected in order to track the cause of a problem and respond thereto. In other words, in order to find the process in which abnormal behavior has occurred, processes are traced in such a way that a parent process that executes a child process is sequentially traced and information about the process is collected at step S127.

Then, whether the process in which the abnormal behavior occurred is a network process is checked at step S128. If it is determined at step S128 that the process in which the abnormal behavior occurred is a network process, step S130 is performed. Accordingly, using the function of checking the network connecting the main device and the terminal device and tracing processes, connected network processes are checked and processes are traced by linking a parent process to a child process thereof, whereby processes of finding the cause of a problem, raising a warning, and responding to the problem are performed. If it is determined that the process in which the abnormal behavior occurred is not a network process, because the cause of the abnormal behavior is limited to a problem only in the main device or in the terminal device, regardless of the presence of other devices, step S140 is performed to raise a warning and to enable the device to individually respond to the problem.

According to the apparatus and method for detecting abnormal behavior in the present invention, because abnormal behavior is detected by a central apparatus for detecting abnormal behavior based on a whitelist, a monitoring system may be constructed such that a main device and a terminal device are monitored by being linked to each other, without increasing the load on the main device or the terminal device.

Also, according to the apparatus and method for detecting abnormal behavior in the present invention, it is possible to construct a system that is most economical in terms of expense and most effective in monitoring a network state and terminal devices distributed in a wide field area network, such as an intelligent power distribution system or an Advanced Meter Infrastructure (AMI) network.

Also, according to the apparatus and method for detecting abnormal behavior in the present invention, the abnormal use of a process and program is detected based on a whitelist, and system state values are additionally monitored even if no problem is found as the result of monitoring using the whitelist. Accordingly, the cause of a problem occurring in a main device or a terminal device is detected early. Also, because a network connection process is tracked, the cause of abnormal behavior occurring in a field area network may be analyzed and solved, whereby the availability of a network and system may be maximally guaranteed.

As described above, optimal embodiments of the present invention have been disclosed in the drawings and the specification. Although specific terms have been used in the present specification, these are merely intended to describe the present invention, and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An apparatus for detecting abnormal behavior, which collects system information from a main device and system information from a terminal device in a control network through the control network and detects the abnormal behavior in the main device and the terminal device based on the collected system information, the apparatus comprising a processor which includes:
   an information collecting processor for collecting the system information about the main device and the system information about the terminal device; and
   a detecting processor for:
      extracting information to be checked from the system information about the main device and the system information about the terminal device; and checking at least one of whether at least one of an unauthorized file or an unauthorized process is executed in the main device or the terminal device, or whether an unauthorized network connection is present by comparing the information to be checked with a whitelist, wherein the whitelist includes a process whitelist, a file whitelist, and a network whitelist; and a tracking processor, when the unauthorized network connection is present, for tracking a cause of a problem by comparing the process whitelist, which includes information about a parent process for each of the main device and the terminal device, information about a child process for each of the main device and the terminal device, and a hash value for each of the main device and the terminal device, with the parent process and the child process for each of the main device and the terminal device.

2. The apparatus for detecting abnormal behavior of claim 1, wherein the detecting processor further comprises a state determination module by which information about a state value is extracted from the system information and at least one of whether resources used for at least one of a file or a process, executed in the main device or terminal device, are fewer than predetermined resources or whether a network load is less than a predetermined load threshold value is determined based on the information about the state value.

3. The apparatus for detecting abnormal behavior of claim 2, wherein the information about the state value includes information about a process state value, information about a file state value, and information about a network state value for each of the main device and the terminal device, wherein the information about the process state value includes information about a process executed in each of the main device and the terminal device and information about a threshold amount of resources used for the process, the information about the file state value includes information about a file executed in each of the main device and the terminal device, a pattern of access to the file, and information about a threshold number of accesses to the file, and the information about the network state value includes information about an IP address and port number for a network and information about a network access pattern and a number of sessions.

4. The apparatus for detecting abnormal behavior of claim 2, wherein when the device check module determines that there is no problem in the main device or the terminal device, the state determination module performs the determination.

5. The apparatus for detecting abnormal behavior of claim 2, wherein the detecting processor further comprises a network check module for determining whether an unauthorized network process or an unauthorized service connection is present in the main device or the terminal device.

6. The apparatus for detecting abnormal behavior of claim 1, further comprising a countermeasure for generating and transmitting a countermeasure signal when abnormal behavior is detected in at least one of the main device or the terminal device.

7. The apparatus for detecting abnormal behavior of claim 1, wherein the file whitelist includes information about a file, information about a file access process, and the hash value for each of the main device and the terminal device.

8. The apparatus for detecting abnormal behavior of claim 1, wherein the network whitelist includes an IP address and port number for a network, information about a network process, and the hash value for each of the main device and the terminal device.

9. A method for detecting abnormal behavior, in which system information is collected from a main device and system information is collected from a terminal device in a control network through the control network and abnormal behavior in the main device and the terminal device is detected based on the collected system information, comprising a processor for performing steps of:

collecting the system information about the main device and the system information about the terminal device; and extracting information to be checked from the system information about the main device and the system information about the terminal device;

checking at least one of whether at least one of an unauthorized file or an unauthorized process is executed in the main device or the terminal device, or whether an unauthorized network connection is present by comparing the information to be checked with a whitelist, wherein the whitelist includes a process whitelist, a file whitelist, and a network whitelist; and tracking, when the unauthorized network connection is present, a cause of a problem by comparing a process whitelist, which includes information about a parent process for each of the main device and the terminal device, information about a child process for each of the main device and the terminal device, and a hash value for each of the main device and the terminal device, with the parent process and the child process for each of the main device and the terminal device.

10. The method for detecting abnormal behavior of claim 9, wherein detecting the abnormal behavior in the main device and the terminal device further comprises extracting, by a state determination module, information about a state value from the system information, and determining, by the state determination module, at least one of whether resources used for at least one of a file or a process, executed in the main device or the terminal device, are fewer than predetermined resources or whether a network load is less than a predetermined load threshold value based on the information about the state value.

11. The method for detecting abnormal behavior of claim 10, wherein the information about the state value includes information about a process state value, information about a file state value, and information about a network state value for each of the main device and the terminal device, wherein the information about the process state value includes information about a process executed in each of the main device and the terminal device and information about a threshold amount of resources used for the process, the information about the file state value includes information about a file executed in each of the main device and the terminal device, a pattern of access to the file, and information about a threshold number of accesses to the file, and the information about the network state value includes information about an IP address and port number for a network and information about a network access pattern and a number of sessions.

12. The method for detecting abnormal behavior of claim 10, wherein determining at least one of whether resources used for at least one of a file or a process, executed in the main device or the terminal device, are fewer than the predetermined resources or whether a network load is less than the predetermined load threshold value is performed when it is determined that there is no problem in the main device or the terminal device as a result of checking at least one of whether at least one of the unauthorized file or the unauthorized process is executed in the main device or the terminal device or whether the unauthorized network connection is present.

13. The method for detecting abnormal behavior of claim 10, wherein detecting the abnormal behavior in the main device and the terminal device further comprises:
   checking, by a network check module, whether an unauthorized network process or an unauthorized service connection is present in the main device or the terminal device.

14. The method for detecting abnormal behavior of claim 9, further comprising:
   generating and transmitting a countermeasure signal when abnormal behavior is detected in at least one of the main device or the terminal device.

15. The method for detecting abnormal behavior of claim 9, wherein the file whitelist includes information about a file, information about a file access process, and the hash value for each of the main device and the terminal device.

16. The method for detecting abnormal behavior of claim 9, wherein the network whitelist includes an IP address and port number for a network, information about a network process, and the hash value for each of the main device and the terminal device.

* * * * *